(12) United States Patent
Chehroudi et al.

(10) Patent No.: US 7,665,985 B1
(45) Date of Patent: Feb. 23, 2010

(54) APPARATUS FOR DISTRIBUTED IGNITION OF FUELS BY LIGHT SOURCES

(75) Inventors: Behrouz Chehroudi, Laguna Niguel, CA (US); Ghanshyam L. Vaghjiani, Palmdale, CA (US); Andrew David Ketsdever, Alta Loma, CA (US)

(73) Assignee: ERC Incorporated, Huntsville, AL (US)

( * ) Notice: Subject to any disclaimer, the term of this patent is extended or adjusted under 35 U.S.C. 154(b) by 0 days.

(21) Appl. No.: 11/492,728

(22) Filed: Jul. 25, 2006

Related U.S. Application Data

(62) Division of application No. 10/888,240, filed on Jul. 9, 2004, now Pat. No. 7,517,215.

(51) Int. Cl.
*C10L 1/12* (2006.01)
(52) U.S. Cl. .................. 431/2; 431/4; 431/6; 431/268
(58) Field of Classification Search .............. 431/4, 431/268, 2
See application file for complete search history.

(56) References Cited

U.S. PATENT DOCUMENTS

| 4,434,753 | A  | * | 3/1984 | Mukainakano et al. .. | 123/143 B |
| 5,769,621 | A  | * | 6/1998 | Early et al. .................. | 431/2 |
| 7,217,404 | B2 | * | 5/2007 | Ajayan et al. ............. | 423/447.1 |
| 2004/0004062 | A1 | * | 1/2004 | Kumar et al. ........... | 219/121.46 |
| 2004/0040637 | A1 | * | 3/2004 | Desilets et al. ........... | 149/108.2 |

* cited by examiner

*Primary Examiner*—Alfred Basichas
(74) *Attorney, Agent, or Firm*—George P. Kobler; Lanier Ford Shaver & Payne, P.C.

(57) ABSTRACT

An apparatus for distributed ignition is disclosed wherein a combustion fuel and an ignition mixture are combined where the ignition mixture comprises ignition agents and fuel and where ignition agents can be nano-metallic particles in combination with single-walled carbon nano-tubes (SWCNTs). The combination of ignition mixture and combustion fuel in the presence of oxygen are exposed to light causing heating of the ignition agents and combustion of the fuel within which the ignition agents are interspersed. A system for igniting fuels using the method is also disclosed.

15 Claims, 4 Drawing Sheets

APPARATUS FOR DISTRIBUTED IGNITION OF FUELS BY LIGHT SOURCES

CROSS-REFERENCE TO RELATED APPLICATIONS

This application is a divisional application under 35 U.S.C. § 121 of pending U.S. patent application Ser. No. 10/888,240, filed Jul. 9, 2004.

STATEMENT REGARDING FEDERALLY SPONSORED RESEARCH OR DEVELOPMENT

The U.S. Government has a paid-up license in this invention and the right in limited circumstances to require the patent owner to license others on reasonable terms as provided for by the terms of Contract No. F04611-99-C-0025 awarded by the U.S. Air Force.

BACKGROUND

1. Field

The present invention relates to distributed ignition (or heating) of fuels, propellants, energetic materials and related combustible materials, and in particular it relates to the use of certain ignition agents, in ignition of fuels, propellants, energetic materials, and related combustible materials.

2. Description of the Related Art

Many industrial processes that utilize chemical reactions in their applications often require an initiation stimulus to start the conversion of the chemicals. The process that initiates the combustion of fuels is commonly referred to as ignition. It is a critical systems component for most combustion processes especially in mobile or stationary power producing machines. For example, improper ignition during the firing of a rocket engine during lift-off can lead to a catastrophic engine failure and possible loss of the spacecraft and human life. Also, the ignition characteristics in a gasoline-fueled automotive engine can strongly affect the fuel's initial burn rate, the chamber's combustion efficiency and the exhaust stream's emission profile.

Although many ignition methods exist, by far the most popular one is the spark igniter. It requires high energy inputs via high voltage circuitry and often heavy components, and by its nature is a single-point stimulus method. In other words, the ignition initially occurs at the point where the igniter is located and it is hoped that the flame will spread from there throughout the volume in which combustion is desired.

Other ignition methods such as plasma jet injection or flame jet initiation, and high-power laser ignition are all bulky, heavy and expensive to operate. Yet other approaches to ignition can be through the usage of pyrolytic charges or via the mixing of hypergolic chemical components, or via activation over catalytic beds, all of which either make use of hazardous chemicals and/or of highly specialized materials or sophisticated mixing machinery. Again these are either single-point initiation methods as in the case of focused-laser ignition or limited to a narrowly defined region in the combustion chamber.

Another disadvantage of these ignition systems, with the exception of perhaps lasers, is that once they are installed on an engine, the ignition location remains fixed with respect to the combustion chamber. It is often preferable to have a plurality of ignition points to initiate a uniform or well-distributed combustion initiation. However, using the above described fixed point ignition techniques, multi-point ignition within a chamber can only be achieved by repeated implementation of the ignition hardware, which spatially can be very restrictive to attain as well as increasing engine size and mass over a single-point ignition system. Additionally, the ability to select and continuously vary the ignition locations or regions in an engine as a parameter, or "distributed ignition," is a critical and useful engineering design component for better control of the start-up transient and for developing high efficiency combustion chambers. Current ignition methods also suffer from one or more other disadvantages such as combustion instability, start-up transients which decrease engine efficiency, and increased pollutant emissions.

Thus, an ignition method is needed which is effective as a multi-point or distributed ignition while allowing design versatility in decreasing mass and size of the engine. At the same time, such a method should exhibit increased ignition efficiency and reduced harmful emission content.

SUMMARY

The present disclosure is directed to a distributed ignition method which satisfies this need.

For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein.

Distributed ignition can be achieved when certain ignition agents, i.e., micro- or nano-structured materials such as nano-metallic particles including single-walled carbon nano-tubes (SWCNTs,) are fluidized with either the fuel or the oxidizer or mixtures thereof and flash ignited.

Therefore, the present method of distributed ignition comprises the steps of obtaining an ignition mixture where the ignition mixture is ignition agents and a fuel, combining the ignition mixture with a combustion fuel, where the ignition agents are well distributed throughout the combustion mixture, and exposing the ignition agents interspersed within the combustion fuel to light radiation in the presence of oxygen.

In a further embodiment, the ignition agents are a combination of nano-metallic particles and SWCNTs.

In still a further embodiment, the source of the light radiation is one of a flash device, for example a camera flash, a light-emitting diode, a laser diode or the like.

In yet another embodiment, the combustion fuel is one of a solid fuel, a gaseous fuel and a liquid fuel.

A system for using the method is also set forth, comprising a combustion chamber, first ducting coupled thereto for porting combustion fuel therein, second ducting coupled to the combustion chamber for porting an ignition mixture therein, where the ignition mixture is ignition agents and at least one of a first fuel, and a light source radiating light into the combustion chamber in the presence of the ignition mixture and the combustion fuel.

These and other embodiments of the present invention will also become readily apparent to those skilled in the art from the following detailed description of the embodiments having reference to the attached figures, the invention not being limited to any particular embodiment(s) disclosed. It is intended that all such additional systems, methods, features, and advantages be included within this description, be within the scope of the present invention, and be protected by the accompanying claims.

BRIEF DESCRIPTION OF THE DRAWINGS

The present invention is described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION

Figure 1:
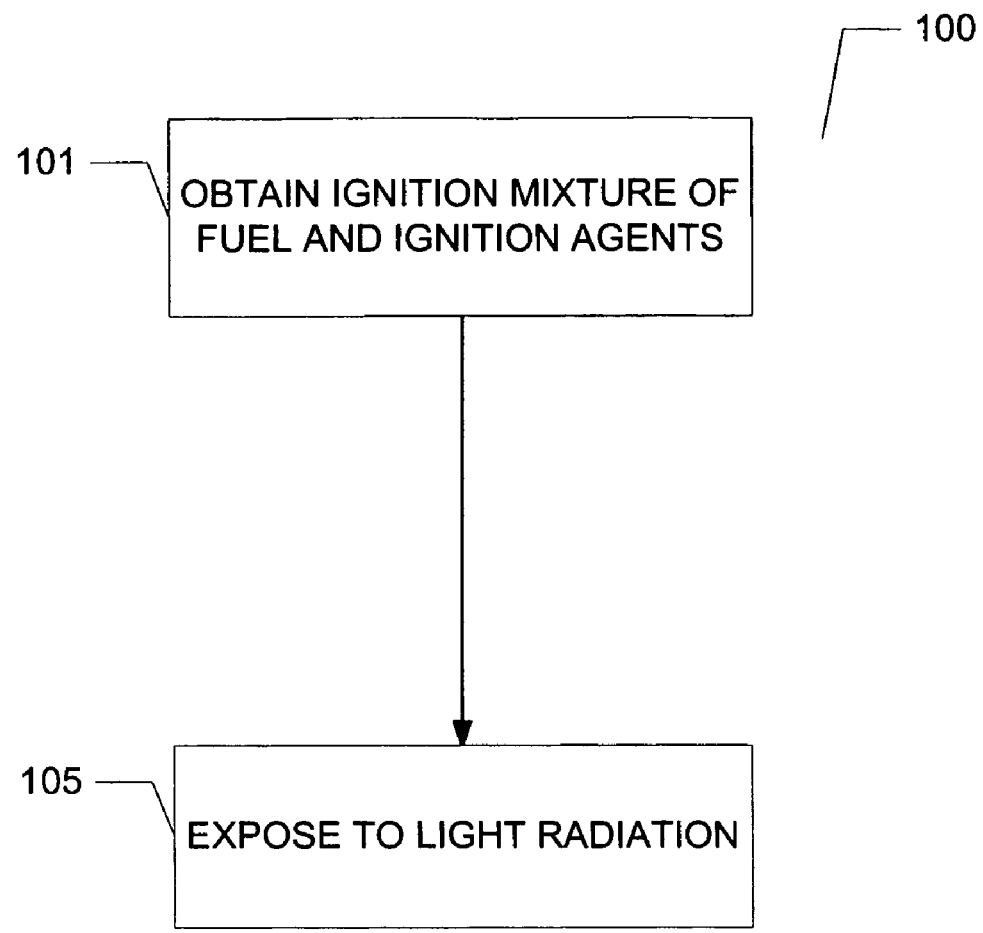
FIG. 1 is a flow chart depicting the inventive method according to an embodiment of the present invention.

The various embodiments of the present invention and their advantages are best understood by referring to FIGS. 1 through 4 of the drawings. The elements of the drawings are not necessarily to scale, emphasis instead being placed upon clearly illustrating the principles of the invention. Throughout the drawings, like numerals are used for like and corresponding parts of the various drawings.

This invention may be provided in other specific forms and embodiments without departing from the essential characteristics as described herein. The embodiments described above are to be considered in all aspects as illustrative only and not restrictive in any manner. The following claims rather than the foregoing description indicate the scope of the invention.

Carbon nanotubes were first discovered in 1991 by a Japanese electron microscopist, Sumio Iijima, who was studying cathodic material deposition in an arc-evaporation reactor during the synthesis of fullerenes. The structure of this newly discovered material consisted of graphene cylinders that were closed at either ends with caps containing pentagonal carbon rings. The cylinder diameter range (1 to a few nanometers) was much smaller than the cylinder length range (1 to a few micrometers).

A variety of other manufacturing schemes has since been developed to synthesize and purify carbon nanotubes with tailored compositions and structural functionalities. For example, those skilled in the relevant art now routinely use the techniques of laser ablation, chemical vapor deposition and metal-catalyzed disproportionation of suitable carbonaceous feedstocks to tailor their nano-syntheons. Some nano-particles, so called because of the intrinsic size of their building blocks, i.e., on the order of nanometers, have been shown to exhibit unusual photochemical, electronic, thermal and mechanical properties never seen before in their corresponding bulk counterparts or anticipated from conventional understanding at the molecular level. This is because such particulates can behave as isolated quantum states.

For example, depending on the chirality and the diameter, SWCNTs can be metallic, semi-metallic, or semi-conductive one-dimensional objects, and their longitudinal thermal conductivity can exceed the in-plane thermal conductivity of graphite. Ropes made of SWCNTs exhibit very high tensile strength e.g., 100 times that of steel have recently been determined experimentally. When dispersed in another medium, SWCNTs can retain their intrinsic mechanical attributes or even augment the structural properties of the host.

One unique property of SWCNTs is their ability to heat up and burn upon exposure to light as described in References [1]-[8] included following this description and are incorporated herein by reference. The present invention exploits this trait and to provide an invention that is simplistic in nature, yet very versatile for the purpose of facile and distributed ignition of fuel materials. Present along with SWCNTs are other nano-metallic particles, non-limiting examples of which are nano-particles of iron, nickel, cobalt and palladium that are by-products of the SWCNT growth process. These non-SWCNT nano-particles also exhibit the characteristic to combust upon exposure to light. However, it is believed that the SWCNTs play a stabilizing role for the highly pyrophoric nano-particles of iron. Hence, in conjunction with SWCNT, these nano-particles are stable and not spontaneously flammable as a system. So far, many agents have been identified that burn upon exposure to flash-light illumination. They are generally micron and nano sized metallic particles. Silicon nanowires have also been shown to ignite under similar conditions. Collectively, such particles may be hereinafter referred to as "ignition agents."

With reference to FIG. 1, embodiments of the present invention provide a new method 100 that is simplistic and very versatile in nature for multi-point and distributive ignition of fuel materials. In this regard, the present method, 100 can be broadly summarized by the two steps described hereinafter. A fluidized mixture, or ignition mixture, of a fuel and ignition agents 101, such as nano-metallic particles and SWCNTs, is obtained. A light source, such as an ordinary camera flash unit, is discharged into the ignition mixture 105 in the presence of oxygen resulting in the nano-particles embedded in the nanotubes igniting throughout the ignition mixture and leading to a violent and spectacular combustion event and the establishment of a stable flame over the whole region of the ignition mixture.

Those skilled in the relevant arts with the benefit of reading this disclosure will appreciate, that the above described "ignition method" 100 embodiment is of particular attraction for the realization of selective multi-point and/or distributed ignition in liquid fueled spray and solid-fueled combustors of rocket engines, homogeneously-charged compression ignition (HCCI) engines, and gas turbine engines for effective startup and relight, improving startup transients and combustion instabilities, increasing overall combustion efficiencies, and lowering of emission of pollutants.

An exemplary apparatus employing the present inventive ignition method 100 in a liquid-fueled rocket engine will be described with reference to FIG. 2. A liquid-fueled rocket engine 200 is fed by main fuel feed system 201. Reservoir 203 holds ignition mixture comprising fuel and ignition agents 209 is coupled through the injector plate 204 to the combustion chamber 211.

Oxidizer 202 is added into combustion chamber 211, also through the injector plate 204. Light source 205 is mounted on rocket engine 200 such that light source 205 emits light into combustion chamber 211. Illumination angle 206 of light source 205 is preferably variable. Emission pattern of the light may be conical, planar, or cylindrical.

In operation, fuel is delivered by main fuel feed system 201 along with oxidizer 202 through injector plate 204 into combustion chamber 211, as with conventionally ignited rocket engines. Ignition mixture is likewise pumped through injector plate 204 into combustion chamber. The result of traveling through injector plate under pressure atomizes fuel, and ignition mixture into droplets 208. Note that the ignition agents 209 exist both in the ignition mixture droplets 208 from reservoir 203 and free-floating in the surrounding gaseous environment subsequent to droplet vaporization as represented in inset in FIG. 1. The surrounding gas therefore, comprises oxidizer 202, vaporized fuel, and ignition agents 209, resulting in an environment conducive to this new ignition method. Activation of light source 205 and its interaction with the ignition agents 209 in presence of the fuel and oxidizer molecules bring about multi-point or distributed ignition of the mixture of fuel and oxidizer. The lighted ignition agents act as nuclei to ignite the main mixture in a multi-point fashion.

Once steady-state rocket combustion has been achieved, the flow of separate ignition agents 203 may be stopped and light source 205 may be deactivated. In the event of an engine shutdown, the combustion method 100 may be re-performed.

Timing of the introduction and cessation of introduction of ignition agents, fuel and oxidizer as well as activation and deactivation of light source may be controlled in any manner known in the relevant arts and may be either achieved by mechanical, electro-mechanical or electronic means and combinations thereof. Specifically, control of all ignition functions can be implemented with a processor (not shown) programmed to perform such functions which will be described in greater detail below.

In an alternate embodiment, ignition agents 209 may be mixed with fuel in the main fuel feed system 201 even though they are not needed after the initial successful ignition, thus eliminating the requirement for a separate reservoir 203. This latter configuration is appropriate where the price of ignition agents 209 is low enough to cost-effectively add an amount to the fuel sufficient to achieve ignition. In a further alternative, fuel may be a suitably formulated monopropellant fuel, where oxygen for the combustion reaction is present in sufficient quantity within the fuel, thus eliminating the need for a separate oxidizer.

Although not depicted in the figures, a solid fuel rocket engine could be adapted to use the present inventive method where a fluidized mixture could be introduced to the solid fuel within the combustion chamber and exposed to light radiation, thereby initiating distributed ignition of the solid fuel. At the same time, ignition agents could be mixed within the solid fuel, in a manner similar to the well-known use of aluminum particles, to enhance, and/or control the fuel's burn rate.

Light source 205 could be a flash device similar to those used with ordinary photography equipment or a flashlight. Light source 205 could also be, without limitation, a light-emitting diode, laser diode, a laser, an arc lamp or other light emitting device.

Further, duration of ignition mixture's exposure to the light from the light source may vary depending upon the wavelength of the light radiated. In addition, wavelengths approaching and including the infra-red portion of the spectrum are the most effective for this method. In testing, ignition mixtures composed according to the present inventive method have reacted with various light sources including light from a common incandescent bulb. Duration of exposure can be effected by switch for energizing and de-energizing light source, or by shutter mechanisms to mechanically allow exposure of light to ignition mixture.

Figure 3:
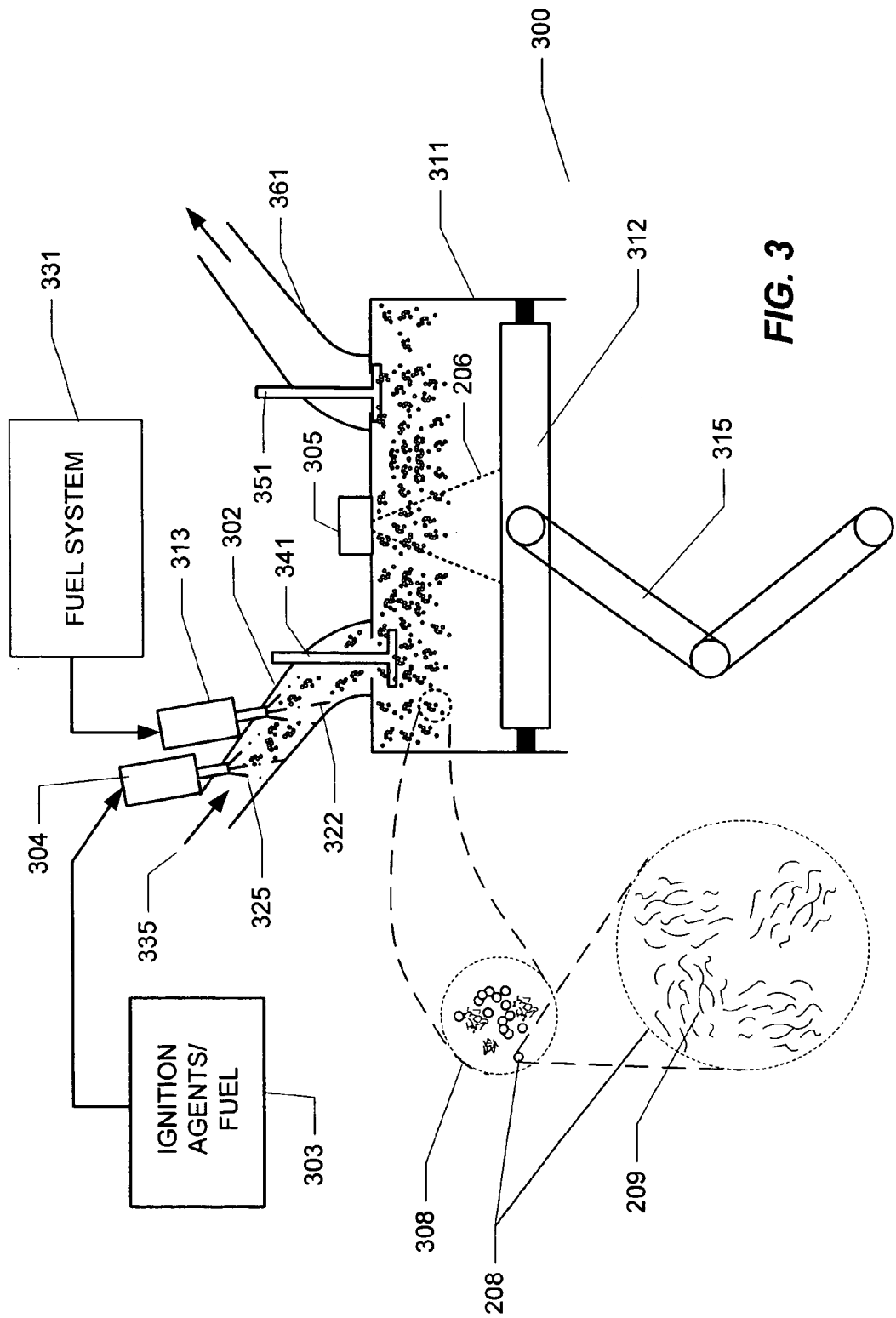
FIG. 3 is a representation of an internal combustion engine according to an embodiment of the present invention.

FIG. 3 is a representation of a further application of the present inventive method in an exemplary reciprocating combustion engine 300. An exemplary liquid-fueled reciprocating engine 300 comprises at least one exemplary cylinder 311 to which is coupled a fuel system 331 via first injector 313 into intake line 302. Reservoir 303 containing ignition mixture 325 of fuel and ignition agent 309 is connected to intake line 302 via second injector 304. Piston 312 is slidably seated within cylinder 311 and is connected to actuator arm 315. Actuator arm 315 can be connected to a crank shaft (not shown) which can drive gears, axles and the like.

Light source 305 is attached to cylinder such that light therefrom is emitted into cylinder 311. Again, light source 305 may have a variable illumination angle. Emission pattern coverage can be conical, planar or cylindrical. Also, as described with reference to FIG. 2, light source 305 may be a flash unit similar to that used in ordinary photography, or flashlight. Light source 305 could also be, without limitation, a light-emitting diode, a laser diode, a laser, an arc lamp or other light emitting devices.

Ignition within reciprocating engine 300 is accomplished when vaporized fuel 322 is ported into intake line 302 through first injector 313 which allows fuel 322 to pass into combustion chamber 311. Substantially simultaneously, ignition mixture 325 is ported into intake line 302 through second injector 304 and is passed into combustion chamber 311 through intake valve 341 along with fuel 322 and oxidizer, which in this case, could be ambient air.

Note that ignition agents 209 exist both in the ignition mixture droplets 208 from reservoir 303 and free-floating in the surrounding gaseous environment subsequent to droplet vaporization as represented in inset 308 in FIG. 3. The surrounding gas therefore, comprises oxidizer, vaporized fuel 322, and ignition agents 209, resulting in an environment conducive to this new ignition method. Ignition is therefore achieved by activation of short-duration light source 305. Interaction of light radiation therefrom with the ignition agents 209 in presence of the fuel 322 and oxidizer molecules bring about multi-point or distributed ignition of the gases within combustion chamber 311.

Ignition of the gases within the cylinder 311 results in an increase in pressure forcing piston 312 away from the valve end of cylinder 311 for the power stroke of actuator arm 315. The return stroke of actuator arm 315 forces piston 312 to slide back into cylinder 311 thus forcing the remnant gases of the previous reaction to exit cylinder via exhaust valve 351 where they are ported away through exhaust system 361.

The timing of movement of intake and exhaust valves 341, 351 respectively, and of activation of light source 305 can be controlled in the same fashion as is generally understood by those skilled in the relevant arts. Timing may be achieved mechanically, electro-mechanically, or electronically using a processor (not shown) programmed to perform such functions, as well as combinations thereof.

In an alternate embodiment, ignition agents 209 may be mixed with fuel in the main fuel feed system 331 even though they are not needed after the initial successful ignition, thus eliminating the requirement for a separate reservoir 303 and second injector 304. This latter configuration is appropriate where the price of ignition agents 209 is low enough to cost-effectively add an amount to the fuel sufficient to achieve ignition.

Figure 2:
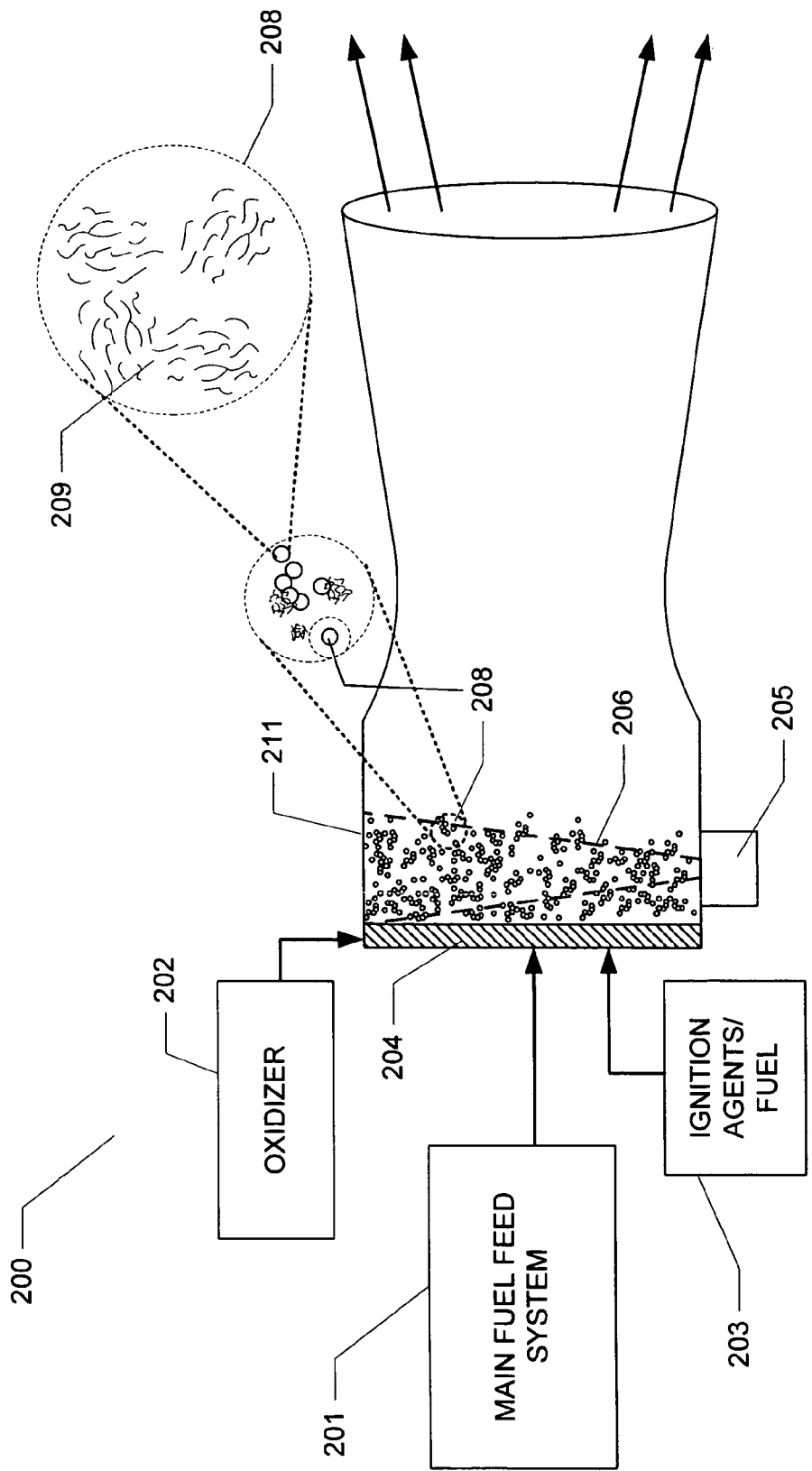
FIG. 2 is a representation of rocket engine according to an embodiment of the present invention.

Many of the functions of both of the exemplary engines depicted in FIGS. 2 and 3 may be controlled through the use of one or more processors. A processor can be implemented by a field programmable gated array (FPGA), a central processing unit (CPU) with a memory or other logic device.

A processor in effect comprises a computer system. Such a computer system includes, for example, one or more processors that are connected to a communication bus. The computer system can also include a main memory, preferably a random access memory (RAM), and can also include a secondary memory. The secondary memory can include, for example, a hard disk drive and/or a removable storage drive.

The removable storage drive reads from and/or writes to a removable storage unit in a well-known manner. The removable storage unit, represents a floppy disk, magnetic tape, optical disk, and the like, which is read by and written to by the removable storage drive. The removable storage unit includes a computer usable storage medium having stored therein computer software and/or data.

The secondary memory can include other similar means for allowing computer programs or other instructions to be loaded into the computer system. Such means can include, for example, a removable storage unit and an interface. Examples of such can include a program cartridge and cartridge interface (such as that found in video game devices), a removable memory chip (such as an EPROM, or PROM) and associated socket, and other removable storage units and interfaces which allow software and data to be transferred from the removable storage unit to the computer system.

Computer programs (also called computer control logic) are stored in the main memory and/or secondary memory. Computer programs can also be received via the communications interface. Such computer programs, when executed, enable the computer system to perform certain features of the present invention as discussed herein, for example, the timing of the operation of intake valve(s) 341 or exhaust valve(s) 351. In particular, the computer programs, when executed, enable a control processor to perform and/or cause the performance of features of the present invention. Accordingly, such computer programs represent controllers of the computer system of a transceiver.

In an embodiment where the timing functions of an engine are implemented using software, the software can be stored in a computer program product and loaded into the computer system using the removable storage drive, the memory chips or the communications interface. The control logic (software), when executed by a control processor, causes the control processor to perform certain functions of the invention as described herein.

In another embodiment, features of the invention are implemented primarily in hardware using, for example, hardware components such as application specific integrated circuits (ASICs) or field-programmable gated arrays (FPGAs). Implementation of the hardware state machine so as to perform the functions described herein will be apparent to persons skilled in the relevant art(s). In yet another embodiment, features of the invention can be implemented using a combination of both hardware and software.

Demonstration

To demonstrate the ignition method 100 stated above, the method of the present invention was devised by separately mixing acetone, the rocket fuels RP-1 (refined petroleum) and nitromethane, the advanced hydrocarbons AF-L-101 (cyclopropylacetylene) and AF-L-103 (1,4-dicyclopropylbut-1,4-diyne), waxed paper and potassium chlorate with ignition agents and then exposing these mixtures to the light output from a single exposure of a camera flash-light unit at ambient conditions of pressure and temperature of air enriched in $O_2$. Acetone and RP-1 are examples of low and high vapor pressure fuels, respectively. Nitromethane is an example of a liquid monopropellant (i.e. the fuel and the oxidizer components are, self-contained within the substance's molecular structure). Finally, waxed paper and potassium chlorate are examples of combustible solids. As opposed to other ignition methods being single-point in effect, ignition method 100 disclosed above inherently provides distributed ignition of the mixture.

Small quantities (1-10 milligrams) of the aforementioned substances are mixed with a few (2-5) milligrams of ignition agents on a microscope glass slide. The surrounding air was enriched with very slowly flowing stream of oxygen from a K-bottle. Exposure to the light from a camera flash-light unit at a distance of about 5 to 10 mm causes rapid heat-up and multi-point or distributed ignition of the mixture. The copious flames emitted in the process are easily seen with a naked eye and were recorded using a CCD camera. It was realized that in the event that the fuel burned out, the remaining ignition agents could be rekindled by exposure to a second flash. This illustrated the robustness of the ignition agents after such a violent chemical reaction. That is, the unconsumed ignition agents retained their attribute to effectively and repeatedly harness the optical energy and rapidly cause a temperature rise within the system that is sufficient for multi-point re-ignition.

The most compelling and consistent observation, among others, is that when the SWCNTs are not present in the fuel bed the flash-light unit is unable to ignite the fuel mixture. Conversely, upon substitution by other forms of carbons such as $C_{60}$-fullerene, multi-wall carbon nanotubes, or ordinary charcoal power in the fluidized bed, it was not possible to initiate ignition of the fuel mixture under otherwise identical experimental exposure conditions.

Figure 4:
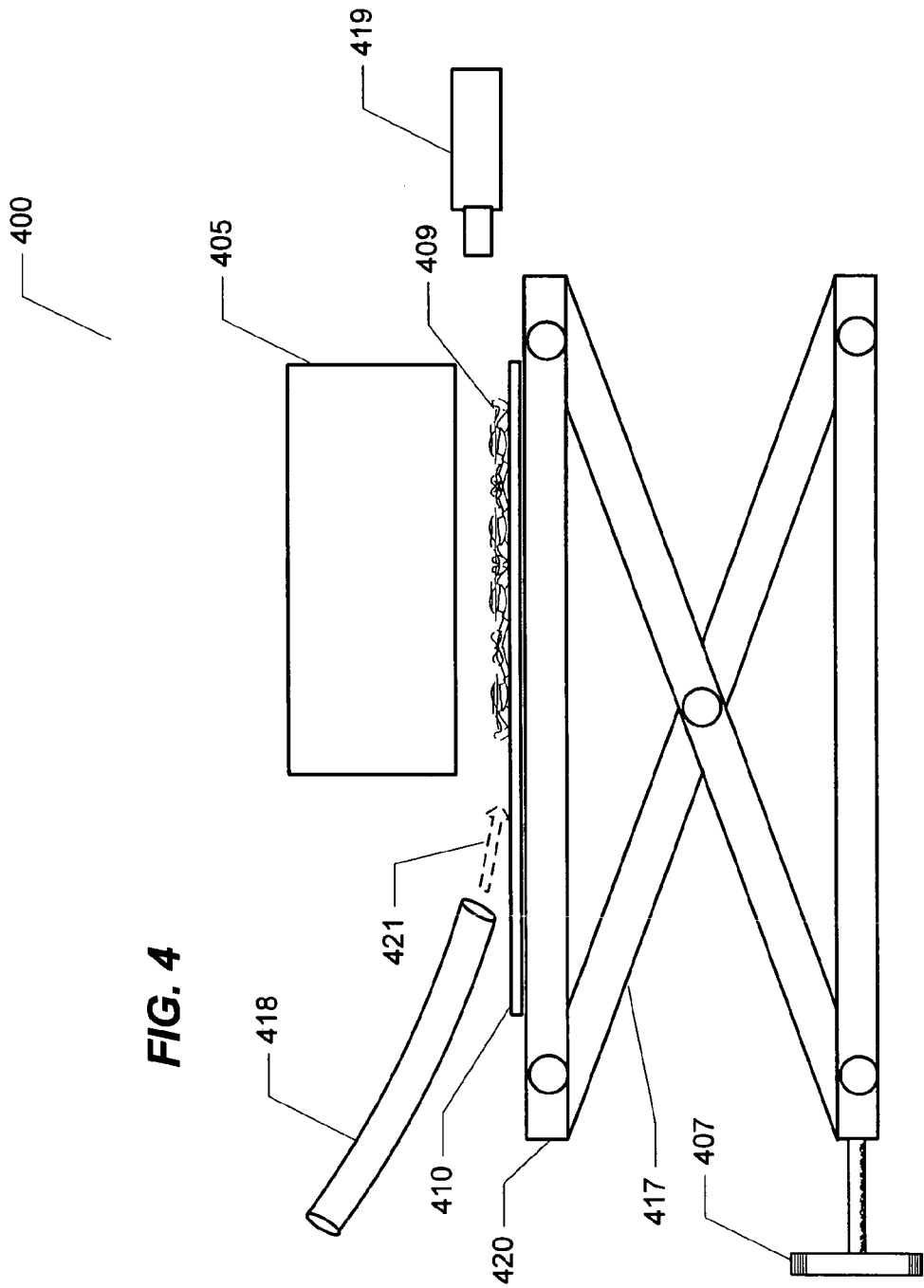
FIG. 4 is a schematic of the experimental arrangement used in laboratory tests performed to demonstrate the viability of the ignition method of the invention with various fuels.

FIG. 4 is a schematic of the experimental arrangement 400 for the tests described in Examples 1 to 7. These tests are performed to demonstrate the ignition of various fuels mixed with SWCNTs carrying nano-metallic particles using an ordinary camera flash-light unit.

An ordinary camera flash 405 is used to illuminate and ignite different fuel samples mixed with SWCNTs carrying nano-metallic particles 409. The mixture of the sample fuel and SWCNTs is formed on a clean microscope glass slide 410 positioned on top of a vertically-traversing stage. Once the mixture is formed, the sample is brought sufficiently close to the face of the flash-light unit through the vertical movement of the traversing stage 420 through a lab jack 417. This is done via rotation of a knob 407. A plastic tube 418 is used to direct flow of the oxidizer 421 toward the sample mixture of the fuel and SWCNTs 409. A video camera 419 is used to document the ignition process for later inspection and analysis.

EXAMPLE 1

RP-1 (Refined Petroleum) and SWCNTs Carrying Nano-Metallic Particles 2 milligrams of SWCNTs carrying nano-metallic particles were placed onto a microscope glass slide placed on a lab jack situated 20 mm directly under a camera flash-light unit. The air above the sample of SWCNTs was enriched with $O_2$ using a Teflon tubing (¼" O.D.) that had the gas flowing at 500 sccm (standard cubic centimeter per minute). The tube ending was typically 3-4 cm from the ignition mixture. 1-2 drops (0.1-0.2 ml) of RP-1 were added to the SWCNTs carrying nano-metallic particles using a Pasteur pipette. The sample was subjected to a single flash exposure and the ensuing event recorded using a color CCD video camera. When the flash unit window was at distances greater than 10 mm from the glass slide, only a characteristic "pop" was audible. The SWCNTs absorb the luminous output of the flash and cause rapid heating within, followed by the release of this energy through a photo-acoustic pulse. The glass slide was thereafter incrementally (1 mm at a time) moved closer to the flash unit by raising the lab jack by turning the knob until we were able to burn these ignition agents and cause the RP-1 to ignite and produce a stable bright blue-yellow flame on the fluidized bed. The burning of the ignition agents was observed to occur at many different isolated (multi-point) locations that were well distributed throughout the matrix of the SWCNTs. These distributed flame-lets cause the nano-particles and the RP-1 to ignite. This entire sequence of experiments was repeated in the absence of any nano-metallic ignition agents on the glass slide to confirm that RP-1 alone did not ignite upon exposure to the camera flash. It was further confirmed that under these conditions when the SWCNTs carrying nano-metallic particles were replaced with 2 milligrams of activated carbon powder, ignition was not possible.

EXAMPLE 2

Acetone with SWCNT Carrying Nano-Metallic Particles

Based upon the observations in the experiments detailed above, it appeared that the optimum exposure distance range for the experiment conditions was 5-6 mm. When 1-2 drops (0.1-0.2 ml) of acetone are added to the ignition agents and subjected to a single flash exposure, a violent flame jet was observed. No such flames were observed with only acetone present. Mixtures of acetone and activated carbon instead of SWCNTs carrying nano-metallic particles failed to ignite under otherwise identical experimental conditions. Also, when these nano-metallic ignition agents were completely immersed in excess acetone, ignition was not possible.

EXAMPLE 3

Nitromethane with SWCNTs Carrying Nano-Metallic Particles 2 drops (0.2 ml) of nitromethane were added to 2 milligrams of SWCNTs carrying nano-metallic particles placed on a glass slide and subjected to a single flash exposure in the $O_2$ enriched air conditions. Accompanying the characteristic photo-acoustic pulse was the formation of a vaporized nitromethane cloud that then ignited into a bright-blue flame. On removal of $O_2$, ignition was not possible but the nitromethane cloud was consistently seen after every flash exposure. The extent of vaporization was deduced to increase with reduction in the exposure distance and increase in the flash output.

EXAMPLE 4

Advanced Hydrocarbon AF-L-101 (cyclopropylacetylene) with SWCNTs Carrying Nano-Metallic Particles 5 drops (0.4 ml) of AF-L-101 were added to a 2 milligram sample of SWCNTs carrying nano-metallic particles and subjected to a single flash exposure at a distance of 5 mm in $O_2$ enriched air. Of all the ignition examples described in these examples, these exposures produced the most violent events. These SWCNTs explosively ignited the AF-L-101 that led to a bright orange-yellow flame with copious ejections of sooty flakes. The flame is extinguished upon consumption of the fuel leaving behind sooted matter mixed with the unburned SWCNTs.

EXAMPLE 5

Advanced Hydrocarbon AF-L-103 (1,4-dicyclopropylbut-1,4-divne) with SWCNTs Carrying Nano-Metallic Particles 5 drops (0.4 ml) of AF-L-103 were added to a 2 milligram sample of SWCNTs carrying nano-metallic particles and subjected to a single flash exposure at a distance of 5 mm in $O_2$ enriched air. There is intense production of vapors that then auto-ignite into a bright orange-yellow flame. This is followed by post ignition luminous flashes within the matrix of the SWCNTs. As in Example 4, there was observed copious ejection of sooty matter.

EXAMPLE 6

Wax Paper with SWCNTS Carrying Nano-Metallic Particles

The wax paper alone showed no damage when exposed to flashes under $O_2$ enriched air. However, with 2 milligrams of the SWCNTs carrying nano-metallic particles placed on the paper, the distributed ignition of the SWCNTs is sufficiently intense to set the wax paper on fire. Use of activated carbon powder instead of the SWCNTs carrying nano-metallic particles failed to reproduce the result.

EXAMPLE 7

Potassium Chlorate with SWCNTs Carrying Nano-Metallic Particles

The head of a safety-match was covered with 2 milligrams of SWCNTs carrying nano-metallic particles and subjected to a single flash exposure under $O_2$ enriched air. The distributed ignition of SWCNTs caused the potassium chlorate (the main ingredient of the match stick head) to pyrolytically ignite into hot flames and set its cardboard stem on fire. Use of activated carbon powder instead of the SWCNTs carrying nano-metallic particles failed to reproduce the result.

CONCLUSION

It will be immediately apparent to those skilled in the relevant arts with the benefit of reading this disclosure that the above-described method may be implemented in a variety of contexts that require the ignition of fuels. For example, in addition to the above described exemplary systems, the method may be employed in solid fuel rocket engines, mono-propellant rocket engines, hybrid rocket engines, jet engines, pulse detonation engines, and micro-power generation devices. The method may also be used in laboratory venues as a source of thermal activation.

As described above and shown in the associated drawings, the present invention comprises a method for distributed ignition of fuel by light sources. While particular embodiments of the invention have been described, it will be understood, however, that the invention is not limited thereto, since modifications may be made by those skilled in the art, particularly in light of the foregoing teachings. It is, therefore, contemplated by the appended claims to cover any such modifications that incorporate those features or those improvements that embody the spirit and scope of the present invention.

REFERENCES

1. Dresselhaus, M. S., Dresselhaus, G., Eklund, P. C., *Science of Fullerenes and Carbon Nanotubes* (Academic, San Diego, 1996).
2. Ruoff, R. S., Lorents, D. C., Mechanical and Thermal Properties of Carbon Nanotubes, Carbon, 33, 925 (1995).
3. Yu, M.-F., Files, B. S. Arepalli, S. Ruoff, R. S., Tensile Loading of Ropes of Single Wall Carbon Nanotubes and Their Mechanical Properties, Phys. Rev. Lett., 84, 5552 (2000).
4. Andrews, R., Jacques, D., Rao, A. M., Rantell, T., Derbyshire, F., Chen, Y., Chen, J., Haddon, R., Nanotube Composite Carbon Fibers, Appl. Phys. Lett., 75, 1329 (1999).
5. Ajayan, P. M., Terrones, M., de la Guardia, A., Huc, V., Grobert, N., Wei, B. Q., Lezec, H., Ramanath, G., Ebbesen, T. W., Nanotubes in a Flash-Ignition and Reconstruction, Science, 296, 705 (2002).
6. Bockrath, B., Johnson, J. K., Sholl, D. S., Howard, B., Matranga, C., Shi, W., Sorescu, D., Igniting Nanotubes With a Flash, Science, 297, 192 (2002).
7. Braidy, N, Botton, G., A., and Andronov, A., Oxidation of Fe Nanoparticles Embedded in Single-Walled Carbon Nanotubes by Exposure to a Bright Flash of White Light, Nano Letters, 2, 1277 (2002).
8. Wang, N., Yao, B. D., Chan, Y. F., Zhang, X. Y., Enhanced Photothermal Effect in Si Nanowires, Nano Letters, 3, 475 (2003).

What is claimed is:

1. An apparatus comprising:
   a. a combustion chamber in communication with an intake line;
   b. a first injector coupled to said intake line, for porting an injectable fuel from a fuel supply into said combustion chamber;
   c. a second injector coupled to said intake line, for porting an injectable ignition mixture from an ignition mixture supply into said combustion chamber said ignition mixture comprising numerous light-ignitable ignition agents and said fuel, said ignition agents comprising at least SWCNTs, such that said ignition agents are spatially distributed to multiple points within said combustion chamber along with said fuel in the presence of oxygen; and
   d. a light source communicating diffused light radiation into said combustion chamber, and wherein said light radiation initiates combustion of said ignition agents at said distributed multiple points within said combustion chamber and thereby igniting said fuel within said chamber.
2. The apparatus of claim 1, further comprising a third ducting coupled to said intake line for porting an oxidizer into said combustion chamber whereby said oxygen is separately introduced into said combustion chamber.
3. The apparatus of claim 1, wherein said ignition agents further comprise at least one of nano-metallic particles and silicon nano-wires.
4. The apparatus of claim 3, wherein said nano-metallic particles are nano-particles of at least one of iron, nickel, cobalt, and palladium.
5. The apparatus of claim 3, wherein said light radiation is of a wavelength in the visible spectrum.
6. The apparatus of claim 3, wherein said light radiation is of a wavelength in the infra-red spectrum.
7. The apparatus of claim 1, wherein said fuel is one of a gaseous fuel and a liquid fuel.
8. The apparatus of claim 1, wherein said fuel is one of
   nitromethane
   acetone
   a kerosene-based rocket fuel
   advanced hydrocarbon AF-L-101 (cyclopropylacetylene)
   advanced hydrocarbon AF-L-103 (1,4-dicyclopropylbut-1,4-diyne).
9. The apparatus of claim 8, wherein said ignition agents further comprise at least one of nano-metallic particles and silicon nano-wires.
10. The apparatus of claim 9, wherein said nano-metallic particles are nano-particles of at least one of iron, nickel, cobalt and palladium.
11. The apparatus of claim 1, wherein said light radiation is generated by a one of a flash device, a light-emitting diode, a laser and a laser diode, and an arc lamp.
12. The apparatus of claim 11, wherein said ignition agents further comprise at least one of nano-metallic particles and silicon nano-wires.
13. The apparatus of claim 12, wherein said fuel is one of a gaseous fuel and a liquid fuel.
14. The apparatus of claim 12, wherein said fuel is one of
   nitromethane
   acetone
   a kerosene-based rocket fuel
   advanced hydrocarbon AF-L-101 (cyclopropylacetylene)
   advanced hydrocarbon AF-L-103 (1,4-dicyclopropylbut-1,4-diyne).
15. The apparatus of claim 1, wherein said system is a component of one of a rocket engine, a gas turbine engine, or a homogeneously charged compression engine.

* * * * *